US010768125B2

(12) United States Patent
Kato et al.

(10) Patent No.: US 10,768,125 B2
(45) Date of Patent: Sep. 8, 2020

(54) WAVELENGTH DISPERSIVE X-RAY FLUORESCENCE SPECTROMETER AND X-RAY FLUORESCENCE ANALYZING METHOD USING THE SAME

(71) Applicant: Rigaku Corporation, Akishima-shi, Tokyo (JP)

(72) Inventors: Shuichi Kato, Akishima (JP); Yoshiyuki Kataoka, Takatsuki (JP); Hajime Fujimura, Takatsuki (JP); Takashi Yamada, Takatsuki (JP)

(73) Assignee: Rigaku Corporation, Akishima-shi, Tokyo (JP)

( * ) Notice: Subject to any disclaimer, the term of this patent is extended or adjusted under 35 U.S.C. 154(b) by 0 days.

(21) Appl. No.: 16/181,544

(22) Filed: Nov. 6, 2018

(65) Prior Publication Data
US 2019/0072504 A1    Mar. 7, 2019

Related U.S. Application Data

(63) Continuation of application No. PCT/JP2017/031495, filed on Aug. 31, 2017.

(30) Foreign Application Priority Data

Sep. 30, 2016   (JP) ................. 2016-194355

(51) Int. Cl.
*G01N 23/223* (2006.01)
*G01N 23/2209* (2018.01)

(52) U.S. Cl.
CPC ....... *G01N 23/223* (2013.01); *G01N 23/2209* (2018.02); *G01N 2223/652* (2013.01)

(58) Field of Classification Search
CPC .................................................. G01N 23/223
See application file for complete search history.

(56) References Cited

U.S. PATENT DOCUMENTS

| 4,282,430 A | * | 8/1981 | Hatten | ..................... G01C 3/10 |
| | | | | 250/221 |
| 4,347,438 A | * | 8/1982 | Spielman | ................. G01V 8/14 |
| | | | | 250/221 |

(Continued)

FOREIGN PATENT DOCUMENTS

| CN | 1739023 A | 2/2006 |
| CN | 102128851 A | 7/2011 |

(Continued)

OTHER PUBLICATIONS

Longtao (A new Background subtraction method for energy dispersive x-ray fluorescence spectra using a cubic spline interpolation, Nuclear Instruments and Methods in Physics Research A 775 (2015) 12-14) (Year: 2015).*

(Continued)

*Primary Examiner* — David P Porta
*Assistant Examiner* — Djura Malevic
(74) *Attorney, Agent, or Firm* — Sughrue Mion, PLLC

(57) ABSTRACT

A wavelength dispersive X-ray fluorescence spectrometer of the present invention includes: a position sensitive detector (10) configured to detect intensities of secondary X-rays (41) at different spectral angles, by using detection elements (7) corresponding to the secondary X-rays (41) at different spectral angles; a measured spectrum display unit (14) configured to display a relationship between a position, in an arrangement direction, of each detection element (7), and a detected intensity by the detection element (7), as a measured spectrum, on a display (15); a detection area setting unit (16) configured to be set a peak area and a background area; and a quantification unit (17) configured to calculate, as a net intensity, an intensity of the fluorescent X-rays to be measured, based on a peak intensity in the peak area, a background intensity in the background area, and a back- (Continued)

ground correction coefficient, and to perform quantitative analysis.

7 Claims, 5 Drawing Sheets

(56) References Cited

U.S. PATENT DOCUMENTS

| | | | | |
|---|---|---|---|---|
| 4,562,585 | A | 12/1985 | Gobel et al. | |
| 4,626,683 | A * | 12/1986 | Van Zeeland | G01B 11/272 250/221 |
| 4,650,989 | A * | 3/1987 | Frigon | G08B 13/183 250/221 |
| 4,956,855 | A | 9/1990 | Brouwer | |
| 5,798,529 | A * | 8/1998 | Wagner | G01B 15/00 250/492.21 |
| 5,812,058 | A * | 9/1998 | Sugimoto | G08B 13/183 340/501 |
| 6,411,215 | B1 * | 6/2002 | Shnier | E05B 17/22 250/221 |
| 6,696,946 | B2 * | 2/2004 | Iwasawa | G08B 13/183 340/541 |
| 6,714,131 | B2 * | 3/2004 | Iwasawa | G08B 13/183 250/221 |
| 6,965,315 | B2 * | 11/2005 | Ikeda | G08B 13/181 250/221 |
| 7,633,067 | B2 * | 12/2009 | Ikeda | G08B 29/18 250/353 |
| 8,384,044 | B2 * | 2/2013 | Sugiura | G01N 21/6452 250/361 R |
| 8,558,182 | B2 * | 10/2013 | Chi | H04N 5/2254 250/336.1 |
| 8,803,106 | B2 * | 8/2014 | Yamaguchi | G01N 21/6445 250/458.1 |
| 9,058,730 | B2 * | 6/2015 | Mullins | G08B 5/38 |
| 9,335,211 | B2 * | 5/2016 | Vasic | G01N 21/6408 |
| 9,528,312 | B2 * | 12/2016 | Shimazu | G01S 7/51 |
| 9,739,730 | B2 | 8/2017 | Hegeman et al. | |
| 10,371,633 | B2 * | 8/2019 | Hegazi | G01N 33/2823 |
| 10,446,369 | B1 * | 10/2019 | Phillips | G01B 11/0683 |
| 2006/0153332 | A1 | 7/2006 | Kohno et al. | |
| 2007/0086567 | A1 | 4/2007 | Kataoka et al. | |
| 2012/0006987 | A1 * | 1/2012 | Rue | G01J 3/0208 250/332 |
| 2012/0211644 | A1 * | 8/2012 | Zheng | G01J 9/00 250/208.2 |
| 2014/0314207 | A1 | 10/2014 | Erko et al. | |
| 2015/0049343 | A1 * | 2/2015 | Shaked | G01B 9/02057 356/503 |
| 2016/0258892 | A1 | 9/2016 | Hegeman et al. | |

FOREIGN PATENT DOCUMENTS

| | | |
|---|---|---|
| CN | 104111263 A | 10/2014 |
| CN | 104677926 A | 6/2015 |
| EP | 3 064 933 A1 | 9/2016 |
| JP | 62-285048 A | 12/1987 |
| JP | 62-287136 A | 12/1987 |
| JP | 01-134292 A | 5/1989 |
| JP | 05-340897 A | 12/1993 |
| JP | 08-128975 A | 5/1996 |
| JP | 2002-214165 A | 7/2002 |
| JP | 2008-298679 A | 12/2008 |
| JP | 4514772 B2 | 7/2010 |
| JP | 2012-002775 A | 1/2012 |
| JP | 2014-211367 A | 11/2014 |
| JP | 5990734 B2 | 9/2016 |
| WO | 2004/086018 A1 | 10/2004 |
| WO | 2015/056305 A1 | 4/2015 |

OTHER PUBLICATIONS

International Search Report for PCT/JP2017/031495 dated Nov. 28, 2017 [PCT/ISA/210].
International Preliminary Report on Patentability dated Apr. 11, 2019 from the International Bureau in counterpart International Application No. PCT/JP2017/031495.
Communication dated Aug. 29, 2019, from the China National Intellectual Property Administration in counterpart Application No. 201780028012.7.
Cao Liguo, et al., "Energy dispersive X-ray fluorescence analysis method", Calculation of Net Peak Area and Deduction of Background Count 14.3.2, Dec. 31, 1998, pp. 219-220 (5 pages total).
Communication dated May 14, 2020 from European Patent Office in EP Application No. 17855566.0.

* cited by examiner

WAVELENGTH DISPERSIVE X-RAY FLUORESCENCE SPECTROMETER AND X-RAY FLUORESCENCE ANALYZING METHOD USING THE SAME

CROSS REFERENCE TO THE RELATED APPLICATION

This application is a continuation application, under 35 U.S.C. § 111(a), of international application No. PCT/JP2017/031495, filed Aug. 31, 2017, which claims priority to Japanese patent application No. 2016-194355, filed Sep. 30, 2016, the entire disclosure of which is herein incorporated by reference as a part of this application.

BACKGROUND OF THE INVENTION

Field of the Invention

The present invention relates to a wavelength dispersive X-ray fluorescence spectrometer having a focusing optical system, and an X-ray fluorescence analyzing method using the same.

Description of Related Art

In X-ray fluorescence analysis, background of fluorescent X-rays generated from a sample irradiated with primary X-rays needs to be accurately corrected in order to precisely measure trace elements contained in the sample. Therefore, a wavelength dispersive X-ray fluorescence spectrometer having a focusing optical system, which: performs monochromating by using a single spectroscopic device; has a receiving slit disposed in front of a single detector and having a plurality of openings adjacent to each other; changes the opening through which secondary X-rays pass; and corrects background of fluorescent X-rays from a sample, is known (Patent Document 1). This focusing optical system is used as a fixed optical system, and is thus used for an X-ray fluorescence spectrometer specific to a single element or a simultaneous multi-elements analysis type X-ray fluorescence spectrometer in general.

In many cases, as shown in FIG. 9 that schematically illustrates a fluorescent X-ray spectrum PS and a background spectrum BS, in a peak area PA in which the spectrum PS of fluorescent X-rays occurs and in adjacent areas of peak BA, the background spectrum BS changes approximately linearly. In general, in a sequential X-ray fluorescence spectrometer, when a goniometer is moved to an adjacent area of peak to measure a background intensity, it is assumed that the background intensity can be measured with almost the same sensitivity between the peak area and the adjacent area of peak, and a net intensity is obtained by subtracting a background measured intensity from a peak measured intensity.

Meanwhile, as in the spectrometer disclosed in Patent Document 1, in a wavelength dispersive X-ray fluorescence spectrometer of a focusing optical system in which a spectroscopic device and a detector are fixed, a receiving slit which is disposed in front of a single detector and which has a plurality of openings adjacent to each other is provided, and an opening through which secondary X-rays pass is changed so as to correspond to an adjacent area of peak, to measure a background intensity. However, a sensitivity is lower than that in a peak area, and, thus, an intensity which is lower than a background intensity that actually occurs, is measured. Therefore, an accurate net intensity cannot be obtained merely by subtracting a background measured intensity in the adjacent area of peak from a peak measured intensity.

Therefore, a wavelength dispersive X-ray fluorescence spectrometer having a focusing optical system, which: has a plurality of spectroscopic devices and a unit for selecting an optical path of secondary X-rays incident on a single detector; switches a spectroscopic device to be used; measures a peak intensity and a background intensity with sensitivities that are assumed to be almost the same; and corrects background of fluorescent X-rays generated from a sample, is known. Furthermore, a spectrometer that has, instead of the optical path selection unit of the above spectrometer, a position sensitive detector as a detector, to simultaneously measure a peak intensity and a background intensity in a short time period, is also known (Patent Document 2).

RELATED DOCUMENT

Patent Document

[Patent Document 1] JP Laid-open Patent Publication No. H08-128975
[Patent Document 2] WO 2004/086018

SUMMARY OF THE INVENTION

However, in the spectrometer disclosed in Patent Document 2, a plurality of spectroscopic devices are provided in order to separately measure fluorescent X-rays and the background thereof, and, therefore, a problem arises that the structure of the spectrometer is complicated, cost is high, and a time required for assembling or alignment of the spectrometer is increased.

The present invention is made in view of the problems of conventional art, and an object of the present invention is to provide: a wavelength dispersive X-ray fluorescence spectrometer that has a simple structure, quickly performs measurement in a background area according to kinds of samples, and accurately corrects background that is measured so as to indicate an intensity lower than a background intensity which actually occurs, to obtain an accurate net intensity and perform high-precision quantitative analysis; and an X-ray fluorescence analyzing method using the wavelength dispersive X-ray fluorescence spectrometer.

In order to attain the aforementioned object, a wavelength dispersive X-ray fluorescence spectrometer according to the present invention is a wavelength dispersive X-ray fluorescence spectrometer, of a focusing optical system, which includes: an X-ray source configured to irradiate a sample with primary X-rays; a divergence slit configured to allow secondary X-rays generated from the sample to pass therethrough; a spectroscopic device configured to monochromate and focus the secondary X-rays that have passed through the divergence slit; and a position sensitive detector configured to have a plurality of detection elements that are disposed in a spectral angle direction of the spectroscopic device, so as to detect intensities of the secondary X-rays at different spectral angles in focused secondary X-rays obtained by the secondary X-rays being focused by the spectroscopic device, by using the detection elements corresponding to the secondary X-rays at different spectral angles, and the divergence slit, the spectroscopic device, and the position sensitive detector are fixed thereto. The wavelength dispersive X-ray fluorescence spectrometer includes a measured spectrum display unit configured to display a relationship between a position, in an arrangement direction, of each detection element, and a detected intensity by the detection element, as a measured spectrum, on a display.

Furthermore, the wavelength dispersive X-ray fluorescence spectrometer according to the present invention incudes: a detection area setting unit configured to allow an operator to set a peak area that is an area of the detection elements corresponding to fluorescent X-rays to be measured, and a background area that is an area of the detection elements corresponding to background of the fluorescent X-rays to be measured, in the arrangement direction of the detection elements; and a quantification unit configured to calculate, as a net intensity, an intensity of the fluorescent X-rays to be measured, based on a peak intensity obtained by integrating detected intensities by the detection elements in the peak area, a background intensity obtained by integrating detected intensities by the detection elements in the background area, and a background correction coefficient which is previously calculated, and to perform quantitative analysis.

The wavelength dispersive X-ray fluorescence spectrometer according to the present invention includes the position sensitive detector, the measured spectrum display unit, the detection area setting unit, and the quantification unit as described above, and accurately and quickly corrects background that is measured so as to indicate an intensity lower than a background intensity which actually occurs, with a simple structure, whereby an accurate net intensity can be obtained and high-precision quantitative analysis can be performed.

In a first X-ray fluorescence analyzing method, according to the present invention, for performing quantitative analysis using the wavelength dispersive X-ray fluorescence spectrometer according to the present invention, for samples of an analytical kind having similar profiles of background of fluorescent X-rays to be measured, in measured spectra displayed by the measured spectrum display unit, the peak area and the background area are set, by the detection area setting unit, based on a measured spectrum of a predetermined sample for setting a detection area, and a single background correction coefficient is calculated based on a background intensity of a predetermined sample for calculating a coefficient.

In the first X-ray fluorescence analyzing method according to the present invention, for the samples of the analytical kind having the similar profiles of background of fluorescent X-rays to be measured, the peak area and the background areas are set based on the measured spectrum of the predetermined sample for setting a detection area, and the single background correction coefficient is calculated based on the background intensity of the predetermined sample for calculating a coefficient, to perform quantitative analysis. Therefore, for the samples of the analytical kind having similar profiles of background, background that is measured so as to indicate an intensity lower than a background intensity which actually occurs, is accurately and quickly corrected with a simple structure, whereby an accurate net intensity can be obtained and high-precision quantitative analysis can be performed.

In a second X-ray fluorescence analyzing method, according to the present invention, for performing quantitative analysis using the wavelength dispersive X-ray fluorescence spectrometer according to the present invention, for samples of an analytical kind having different profiles of background of fluorescent X-rays to be measured, in measured spectra displayed by the measured spectrum display unit, the peak area and the background areas on both sides, respectively, of the peak area are set, by the detection area setting unit, based on a measured spectrum of a predetermined sample for setting a detection area such that a distance between a center of the peak area and a center of one of the background areas and a distance between the center of the peak area and a center of the other of the background areas are equal to each other in the arrangement direction of the detection elements, and two background correction coefficients are calculated based on background intensities of a predetermined sample for calculating a coefficient.

In the second X-ray fluorescence analyzing method according to the present invention, for the samples of the analytical kind among which profiles of background of fluorescent X-rays to be measured are different, the peak area and the background areas on both sides, respectively, of the peak area are set, by the detection area setting unit, based on the measured spectrum of the predetermined sample for setting a detection area such that the distance between the center of the peak area and the center of one of the background areas and the distance between the center of the peak area and the center of the other of the background areas are equal to each other in the arrangement direction of the detection elements, and the two background correction coefficients are calculated based on the background intensities of the predetermined sample for calculating a coefficient, to perform the quantitative analysis. Therefore, for samples of an analytical kind among which profiles of background are different, background that is measured so as to indicate an intensity lower than a background intensity which actually occurs, is accurately and quickly corrected with a simple structure, whereby an accurate net intensity can be obtained and high-precision quantitative analysis can be performed.

In the wavelength dispersive X-ray fluorescence spectrometer according to the present invention, the measured spectrum display unit preferably calculates a sensitivity coefficient as a ratio of an incident intensity to a detected intensity for each detection element, based on a measured spectrum of a predetermined blank sample, on the assumption that an intensity of background incident on the detection elements is constant in the arrangement direction of the detection elements, and preferably displays a relationship between a position in the arrangement direction of the detection elements and a corrected detected intensity obtained by multiplying a detected intensity by the detection element, by the sensitivity coefficient, as a corrected spectrum, on the display, instead of or in addition to the measured spectrum being displayed.

In this wavelength dispersive X-ray fluorescence spectrometer having the advantageous configuration, instead of or in addition to the measured spectrum, the corrected spectrum described above is displayed on the display and background can be more accurately corrected, a net intensity can be more accurately obtained and higher-precision quantitative analysis can be performed.

In a third X-ray fluorescence analyzing method, according to the present invention, for performing quantitative analysis using the wavelength dispersive X-ray fluorescence spectrometer having the advantageous configuration according to the present invention, for samples of an analytical kind having similar profiles of background of fluorescent X-rays to be measured, in corrected spectra displayed by the measured spectrum display unit, the peak area and the background area are set, by the detection area setting unit, based on a corrected spectrum of a predetermined sample for setting a detection area, and a single background correction coefficient is calculated based on a background intensity of a predetermined sample for calculating a coefficient.

In the third X-ray fluorescence analyzing method according to the present invention, the wavelength dispersive X-ray fluorescence spectrometer having the above-described advantageous configuration is used to perform quantitative analysis. Therefore, for the samples of the analytical kind having the similar profiles of background, background can be more accurately corrected, the net intensity can be more accurately obtained, and higher-precision quantitative analysis can be performed.

In a fourth X-ray fluorescence analyzing method, according to the present invention, for performing quantitative analysis using the wavelength dispersive X-ray fluorescence spectrometer having the advantageous configuration according to the present invention, for samples of an analytical kind having different profiles of background of fluorescent X-rays to be measured, in corrected spectra displayed by the measured spectrum display unit, the peak area and the background areas on both sides, respectively, of the peak area are set, by the detection area setting unit, based on a corrected spectrum of a predetermined sample for setting a detection area such that a distance between a center of the peak area and a center of one of the background areas and a distance between the center of the peak area and a center of the other of the background areas are equal to each other in the arrangement direction of the detection elements, and two background correction coefficients are calculated based on background intensities of a predetermined sample for calculating a coefficient.

In the fourth X-ray fluorescence analyzing method according to the present invention, the wavelength dispersive X-ray fluorescence spectrometer having the above-described advantageous configuration is used to perform the quantitative analysis. Therefore, for the samples of the analytical kind having the different profiles of background, background can be more accurately corrected, the net intensity can be more accurately obtained, and higher-precision quantitative analysis can be performed.

In the wavelength dispersive X-ray fluorescence spectrometer according to the present invention, a plurality of receiving areas that are aligned in the arrangement direction of the detection elements are preferably set in a receiving surface of the position sensitive detector, and the receiving area to be used for a spectral angle range to be measured is preferably changed, by the position sensitive detector being moved in the arrangement direction of the detection elements. In this case, a state where the entirety of the position sensitive detector cannot be used due to deterioration in performance of a certain detection element is avoided. Therefore, while the performance of the position sensitive detector, which is expensive, is maintained, the position sensitive detector can be used for a long time period.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
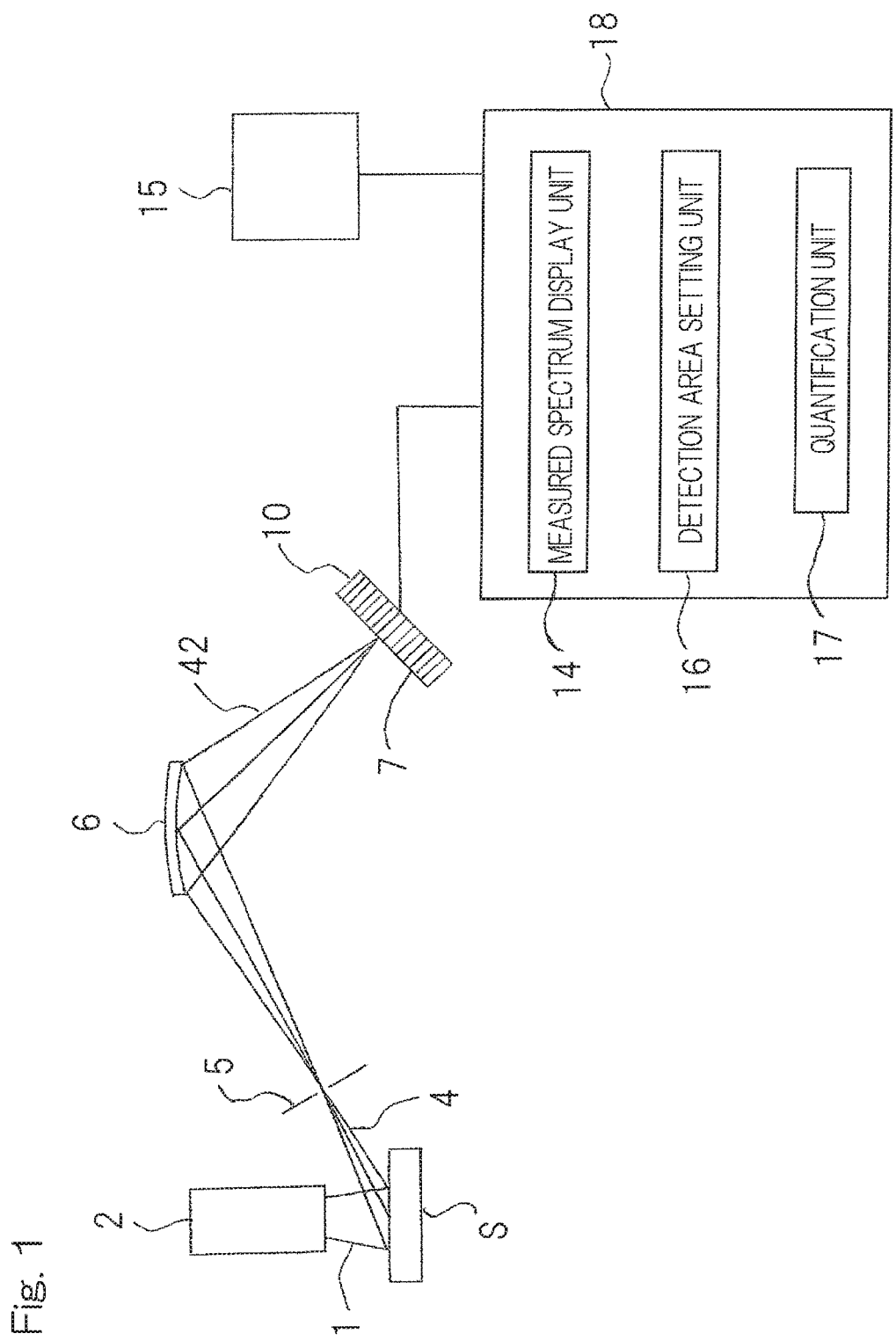
FIG. 1 is a schematic diagram illustrating a wavelength dispersive X-ray fluorescence spectrometer according to a first and a fourth embodiments of the present invention.

Hereinafter, a wavelength dispersive X-ray fluorescence spectrometer according to a first embodiment of the present invention will be described with reference to the drawings. As shown in FIG. 1, this spectrometer is a wavelength dispersive X-ray fluorescence spectrometer, with a focusing optical system, which includes: an X-ray source 2 that irradiates a sample S with primary X-rays 1; a divergence slit 5 which allows secondary X-rays 4 generated from the sample S to pass therethrough; a spectroscopic device 6 that monochromates and focuses the secondary X-rays 4 that have passed through the divergence slit 5; and a position sensitive detector 10 that has a plurality of detection elements 7 which are disposed in a spectral angle direction of the spectroscopic device 6, so as to detect intensities of the secondary X-rays 41 at different spectral angles in focused secondary X-rays 42 obtained by the secondary X-rays 41 being focused by the spectroscopic device 6, by using the detection elements 7 corresponding to the secondary X-rays 41 at different spectral angles. In the wavelength dispersive X-ray fluorescence spectrometer, the divergence slit 5, the spectroscopic device 6, and the position sensitive detector 10 are fixed. The wavelength dispersive X-ray fluorescence spectrometer includes a measured spectrum display unit 14 that displays a relationship between positions, in the arrangement direction, of the detection elements 7, and detected intensities by the detection elements 7, as a measured spectrum, on a display 15.

The position sensitive detector 10 may be a one-dimensional detector having the plurality of detection elements 7 that are disposed in the spectral angle direction of the spectroscopic device 6 so as to be linearly arranged, or a two-dimensional detector having the plurality of detection elements 7 that are arranged in a plane including the spectral angle direction of the spectroscopic device 6. In the spectrometer according to the first embodiment, a one-dimensional detector 10 is used.

Furthermore, this spectrometer includes: a detection area setting unit 16 that allows an operator to set, in the arrangement direction of the detection elements 7, a peak area that is an area of the detection elements 7 corresponding to fluorescent X-rays to be measured, and a background area that is an area of the detection elements 7 corresponding to background of the fluorescent X-rays to be measured; and a quantification unit 17 that calculates, as a net intensity, an intensity of the fluorescent X-rays to be measured, based on a peak intensity obtained by integrating detected intensities by the detection elements 7 in the peak area, a background intensity obtained by integrating detected intensities by the detection elements 7 in the background area, and a background correction coefficient which has been previously input, and that performs quantitative analysis. The measured spectrum display unit 14, the detection area setting unit 16, and the quantification unit 17 are included in a control unit 18 which is, for example, a computer and which controls this wavelength dispersive X-ray fluorescence spectrometer.

Figure 2:
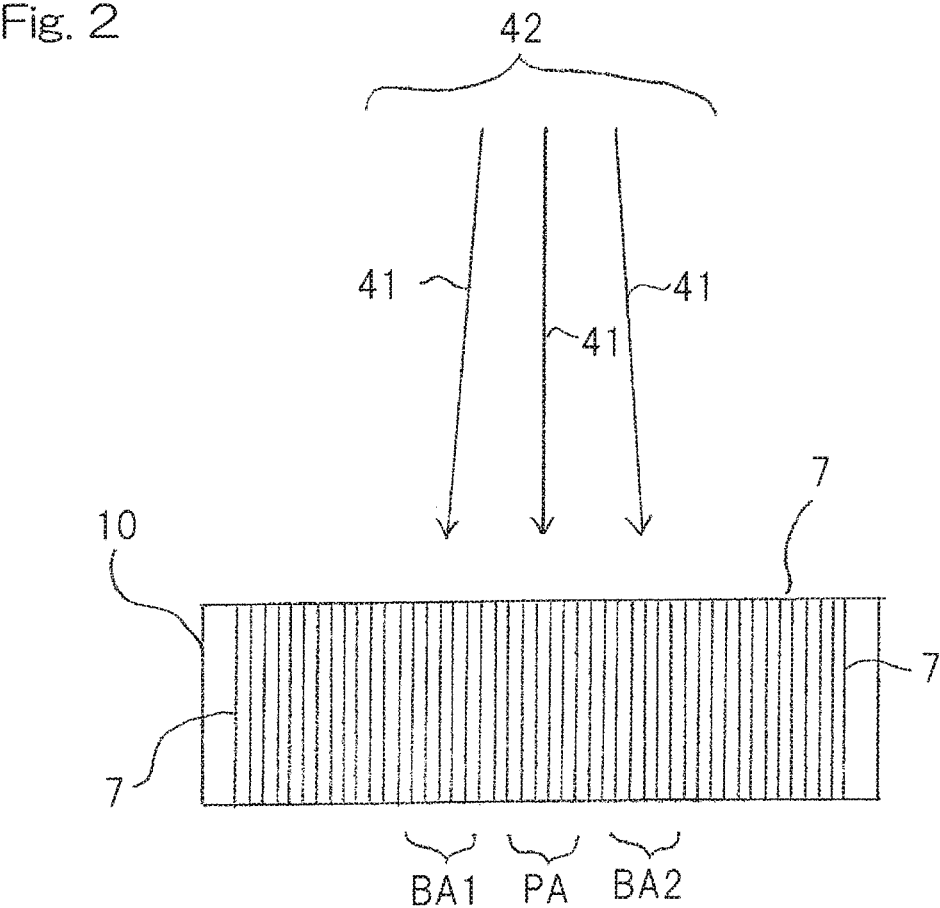
FIG. 2 illustrates detection elements, disposed in a peak area and background areas, which are set by a detection area setting unit.

The receiving surface of the one-dimensional detector 10 is positioned at the focal point of the focused secondary X-rays 42. As shown in FIG. 2, for example, the first detection element 7 to the 256-th detection element 7 are linearly arranged in order, respectively, starting from the smallest spectral angle position (the left side position in FIG. 2, diagonally upper side position in FIG. 1. In FIG. 2, the receiving surface of the one-dimensional detector 10 is viewed from the depth side of the drawing sheet in FIG. 1), at intervals of 75 μm.

The spectrometer according to the first embodiment includes the measured spectrum display unit 14. When an operator sets the peak area and the background area, the measured spectrum display unit 14 is used together with the detection area setting unit 16. For example, the measured spectrum display unit 14 displays the measured spectrum shown in FIG. 3 on the display 15.

Figure 3:
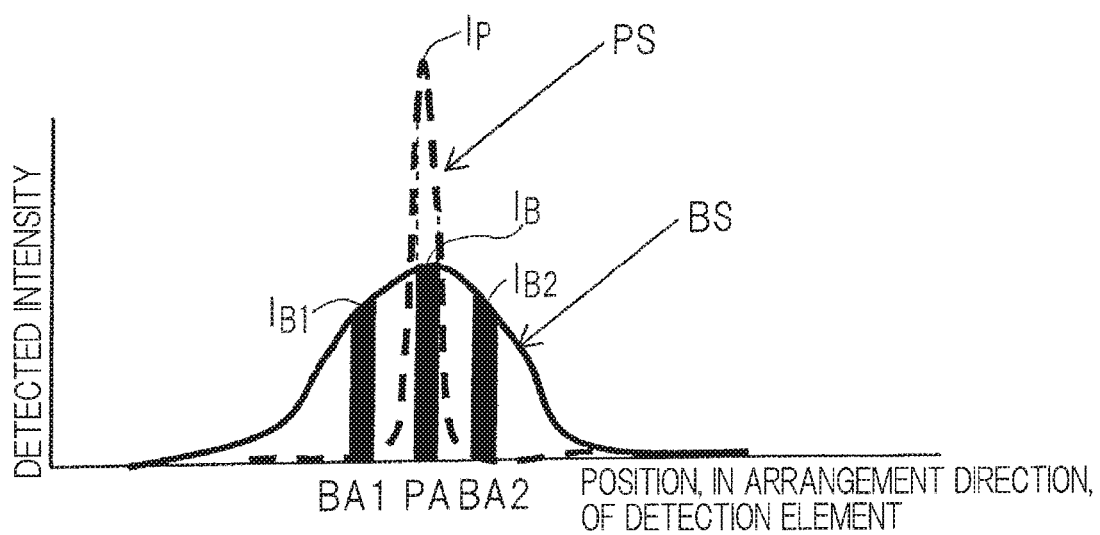
FIG. 3 illustrates a peak area and background areas of a spectrum in which measured spectra of a sample containing a large amount of an element to be measured, and a blank sample overlay each other.

In FIG. 3, measured spectra PS and BS of a sample S that contains a large amount of elements to be measured, and a blank sample S are displayed so as to overlay each other. The intensity of the sample S that contains the large amount of elements to be measured is indicated so as to be reduced, in order to facilitate comparison between the overlaying spectra. For this measured spectrum, the abscissa axis represents positions of the detection elements 7 in the arrangement direction thereof, and may represent the detection element numbers, spectral angles of the spectroscopic device 6, or energy values (the same applies to FIGS. 4 and 5). The ordinate axis represents detected intensities by the detection elements 7. The spectrum PS of fluorescent X-rays measured from the sample S that contains the large amount of elements to be measured is represented by a broken line, and the background spectrum BS measured from the blank sample S is represented by a solid line. A peak area PA, a first background area $BA_1$, and a second background area $BA_2$ are displayed in the abscissa axis direction.

In FIG. 3, in each area $BA_1$, PA, $BA_2$, an area size of a portion that is less than or equal to each spectrum PS, BS (a portion between each spectrum PS, BS and the abscissa axis, three black bar-like portions in the spectrum BS, a portion obtained by further extending the central black bar-like portion with the broken line for the spectrum PS) corresponds to a detected intensity that is detected by the detection elements 7 in each area $BA_1$, PA, $BA_2$ for the sample S corresponding to the spectrum PS, BS. In FIG. 3, for the sample S that contains the large amount of elements to be measured, a detected intensity $I_P$ detected by the detection elements 7 in the peak area PA can be read. For the blank sample S, a detected intensity $I_{B1}$ detected by the detection elements 7 in the first background area $BA_1$, a detected intensity $I_B$ detected by the detection elements 7 in the peak area PA, and a detected intensity $I_{B2}$ detected by the detection elements 7 in the second background area $BA_2$ can be read. Each spectrum PS, BS and each area $BA_1$, PA, $BA_2$ in the abscissa axis direction are displayed on the display 15 by the measured spectrum display unit 14, and a portion corresponding to each detected intensity described above is not necessarily displayed.

An operator performs setting based on the displayed measured spectra PS, BS by using the detection area setting unit 16 such that, for example, the 123-rd to the 129-th detection elements 7 are set for measuring an intensity of fluorescent X-rays in the peak area PA, the 106-th to the 112-nd detection elements 7 are set for measuring background in the first background area $BA_1$, and the 140-th to the 146-th detection elements 7 are set for measuring background in the second background area $BA_2$. The setting of the detection elements 7 is stored in the detection area setting unit 16. Thus, the optimal peak area PA and the optimal background areas $BA_1$ and $BA_2$ can be set based on the displayed measured spectra PS and BS.

When the peak area PA, the first background area $BA_1$, and the second background area $BA_2$ are set in the detection area setting unit 16, the intensity of the secondary X-rays 41 (the center in FIG. 2) in which a spectral angle is a spectral angle θ of the fluorescent X-rays to be measured (analytical line), is detected by the detection elements 7 in the peak area PA, the intensity of the secondary X-rays 41 (the left side in FIG. 2) in which a spectral angle is less than the spectral angle θ, is detected by the detection elements 7 in the first background area $BA_1$, and the intensity of the secondary X-rays 41 (the right side in FIG. 2) in which the spectral angle is greater than the spectral angle θ is detected by the detection elements 7 in the second background area $BA_2$. The focused secondary X-rays 42 shown in FIG. 1 are represented by overlapping of three lines, of the focused secondary X-rays 42, which are slightly different from each other in the spectral angle as described above. In FIG. 2, among the secondary X-rays 41 of the focused secondary X-rays 42, the secondary X-rays 41 on the optical axes are represented as the three lines of the focused secondary X-rays 42.

When an analytical sample S has been measured, the quantification unit 17 appropriately subtracts the background intensity $I_B$ in the peak area from the peak intensity $I_P$ and calculates a net intensity $I_{net}$ of the fluorescent X-rays to be measured, based on equation (1) and equation (2) described below, to perform quantitative analysis. In equation (2), the background intensity $I_B$ in the peak area is calculated as a product of: an intensity obtained by integrating intensities $I_{B1}$ and $I_{B2}$ in the respective background areas; and a background correction coefficient k.

$$I_{net}=I_P-I_B \qquad (1)$$

$$I_B=k(I_{B1}+I_{B2}) \qquad (2)$$

$I_{net}$: calculated net intensity of fluorescent X-rays to be measured $I_P$: peak intensity obtained by integrating detected intensities by detection elements (the 123-rd to the 129-th detection elements) in peak area $I_B$: background intensity in peak area $I_{B1}$: background intensity obtained by integrating detected intensities by detection elements (the 106-th to the 112-nd detection elements) in first background area $I_{B2}$: background intensity obtained by integrating detected intensities by detection elements (the 140-th to the 146-th detection elements) in second background area k: background correction coefficient The background correction coefficient k is previously calculated based on the following equation (3) by measuring, for example, the blank sample S as the sample S for calculating a coefficient, and is input in the quantification unit 17. The background correction coefficient k may be automatically calculated by the quantification unit 17 according to the following equation (3) based on the measured spectrum BS, of the blank sample S, shown in FIG. 3 before the quantitative analysis is performed for the analytical sample S after an operator has set the peak area PA and the background areas $BA_1$ and $BA_2$.

$$k = I_P^B / (I_{B1}^B + I_{B2}^B) \quad (3)$$

$I_P^B$: peak intensity, of blank sample, obtained by integrating detected intensities by detection elements (the 123-rd to the 129-th detection elements) in peak area $I_{B1}^B$: background intensity, of blank sample, obtained by integrating detected intensities by detection elements (the 106-th to the 112-nd detection elements) in first background area $I_{B2}^B$: background intensity, of blank sample, obtained by integrating detected intensities by detection elements (the 140-th to the 146-th detection elements) in second background area The background correction coefficient k may be calculated simultaneously when calibration curve constants are obtained by regression calculation, by using a calibration curve equation of the following equation (4).

$$W = A(I_P - k(I_{B1} + I_{B2})) + B \quad (4)$$

W: content of element, to be measured, in sample

A, B: calibration curve constants

In the example described above, measurement is performed in the two background areas $BA_1$ and $BA_2$, to correct (remove) background. However, the measurement may be performed in one or three or more background areas BA. In the example described above, the number of the detection elements 7 is set such that the number of the detection elements 7 in the peak area PA, the number of the detection elements 7 in the first background area $BA_1$, and the number of the detection elements 7 in the second background area $BA_2$ are the same. However, the numbers may be different.

Figure 4:
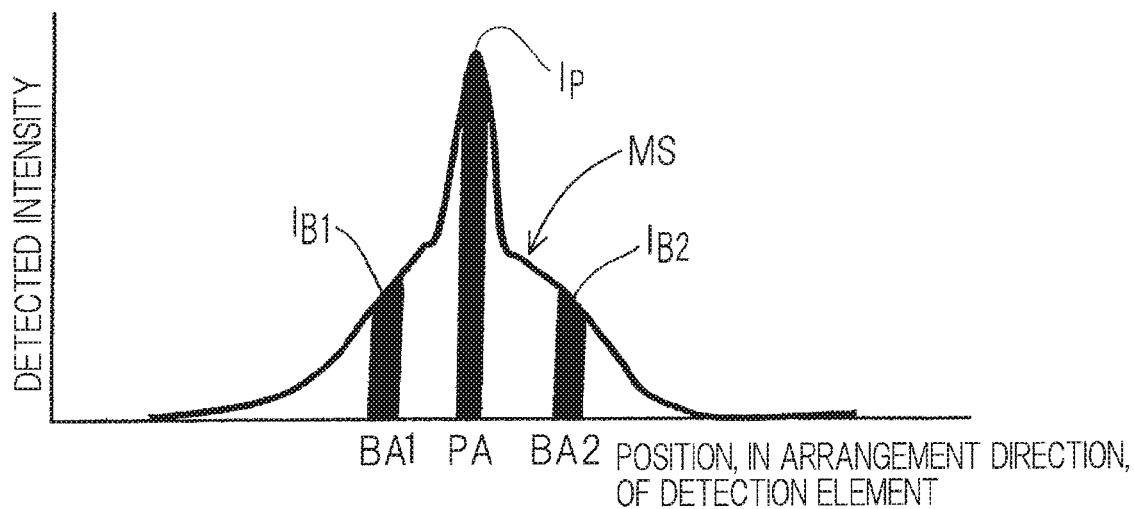
FIG. 4 illustrates a peak measurement area and background measurement areas of a measured spectrum of one sample.

As the measured spectrum of the sample S for setting a detection area, instead of the above-described measured spectrum in which the measured spectra PS and BS of the sample S that contains a large amount of elements to be measured and the blank sample S overlay each other, a measured spectrum MS, of one sample S, by which a spectrum of fluorescent X-rays to be measured, and a background spectrum can be observed may be used as shown in FIG. 4. In FIG. 4, for this one sample S, the detected intensity $I_{B1}$ detected by the detection elements 7 in the first background area $BA_1$, the detected intensity $I_P$ detected by the detection elements 7 in the peak area PA, and the detected intensity $I_{B2}$ detected by the detection elements 7 in the second background area $BA_2$, can be read.

The wavelength dispersive X-ray fluorescence spectrometer according to the first embodiment includes the one-dimensional detector 10, the measured spectrum display unit 14, the detection area setting unit 16, and the quantification unit 17 as described above, and accurately and quickly corrects background that is measured so as to indicate an intensity lower than a background intensity which actually occurs, with a simple structure, whereby an accurate net intensity can be obtained and high-precision quantitative analysis can be performed.

Next, an X-ray fluorescence analyzing method, according to a second embodiment of the present invention, for performing quantitative analysis using the wavelength dispersive X-ray fluorescence spectrometer of the first embodiment, will be described. In this X-ray fluorescence analyzing method, for samples S of an analytical kind having similar profiles of background of fluorescent X-rays to be measured, in measured spectra displayed by the measured spectrum display unit 14, the peak area PA and the background area BA are set, by the detection area setting unit 16, based on the measured spectrum of a predetermined sample S for setting a detection area, and a single background correction coefficient k is calculated based on a background intensity of a predetermined sample S for calculating a coefficient, to be input in the quantification unit 17, thereby performing quantitative analysis.

The samples S of the analytical kind having similar profiles of background of fluorescent X-rays to be measured represent samples S, of an analytical kind, in which profiles of background in the adjacent area of peak are similar to each other even when the sample S is changed among them. This case corresponds to a case where fluorescent X-rays of a heavy element are to be measured for an oxide sample, for example, a case where Pb-Lβ line is to be measured for a sample that is a rock. As the predetermined sample S for setting a detection area, as described for the wavelength dispersive X-ray fluorescence spectrometer according to the first embodiment, two samples S that are the sample S containing a large amount of elements to be measured and the blank sample S may be used, or one sample S by which a spectrum of fluorescent X-rays to be measured and a background spectrum can be observed, may be used.

For example, the sample S, for setting a detection area, which is the sample S containing a large amount of element to be measured and the blank sample S as used for the wavelength dispersive X-ray fluorescence spectrometer according to the first embodiment are measured, and the overlaying measured spectra (FIG. 3) are displayed on the display 15 by the measured spectrum display unit 14. Similarly to an operation for the wavelength dispersive X-ray fluorescence spectrometer according to the first embodiment, based on the displayed measured spectra, the peak area PA and the background area BA, e.g. the first background area $BA_1$ and the second background area $BA_2$ are set by and stored in the detection area setting unit 16.

Next, as the sample S for calculating a coefficient, for example, the blank sample S is measured, and a single background correction coefficient k is obtained similarly to the operation for the wavelength dispersive X-ray fluorescence spectrometer according to the first embodiment. The background correction coefficient k may be obtained simultaneously when calibration curve constants are obtained by regression calculation, by using a calibration curve equation of equation (4) described above. For a plurality of analytical samples S of one analytical kind, a background correction coefficient common to the plurality of analytical samples S is used. The same applies to another embodiment.

The background correction coefficient k is input in advance in the quantification unit 17, or the background correction coefficient k is automatically calculated in advance by the quantification unit 17, and the analytical sample S is measured, whereby the quantification unit 17 calculates the net intensity $I_{net}$ of fluorescent X-rays to be measured and performs quantitative analysis.

In this quantitative analysis, for samples S of an analytical kind having similar profiles of background of fluorescent X-rays to be measured, a background intensity obtained by integrating all the detected intensities by any number of the detection elements 7 set in any number of background areas, and the single background correction coefficient k are used, whereby the net intensity $I_{net}$ of fluorescent X-rays to be measured, can be accurately calculated.

In this X-ray fluorescence analyzing method according to the second embodiment, for the samples S of the analytical kind having the similar profiles of background of fluorescent X-rays to be measured, the peak area PA and the background areas $BA_1$ and $BA_2$ are set based on the measured spectrum of the predetermined sample S for setting a detection area, and the single background correction coefficient k is calculated based on the background intensity $I_B$ of the predetermined sample S for calculating a coefficient, to perform quantitative analysis. Therefore, for the samples S of the analytical kind having the similar profiles of background, background that is measured so as to indicate an intensity lower than a background intensity which actually occurs, is accurately and quickly corrected with a simple structure, whereby an accurate net intensity $I_{net}$ can be obtained and high-precision quantitative analysis can be performed.

Next, an X-ray fluorescence analyzing method, according to a third embodiment of the present invention, for performing quantitative analysis using the wavelength dispersive X-ray fluorescence spectrometer according to the first embodiment will be described. In this X-ray fluorescence analyzing method, for samples S of an analytical kind among which profiles of background of fluorescent X-rays to be measured, in measured spectra displayed by the measured spectrum display unit 14, are different according to, for example, whether or not influence of a skirt of a large interfering peak occurs, the peak area PA and the background areas $BA_1$ and $BA_2$ on both sides, respectively, of the peak area PA are set, by the detection area setting unit 16, based on a measured spectrum of a predetermined sample S for setting a detection area, such that a distance between a center of the peak area PA and a center of one of the background areas $BA_1$ and $BA_2$ is equal to a distance between the center of the peak area PA and a center of the other of the background areas $BA_1$ and $BA_2$ in the arrangement direction of the detection elements 7, and two background correction coefficients k1 and k2 are calculated based on background intensities of a predetermined sample S for calculating a coefficient, to be input in the quantification unit 17, thereby performing the quantitative analysis. It is assumed that, in the peak area of fluorescent X-rays to be measured, and the background areas on both sides thereof, the profile of background intensity which actually occurs is on a straight line.

The samples S of the analytical kind among which profiles of background of fluorescent X-rays to be measured are different represent samples S, of an analytical kind, which include at least one sample S, of an analytical kind, which has a different profile of background in the adjacent area of peak. The samples S are, for example, samples S of an analytical kind including a sample S that generates an interfering line, near the peak area PA.

As the predetermined sample S for setting a detection area, for example, a sample S that generates an interfering line, near the peak area PA, is used. This sample S for setting a detection area is measured, and the measured spectrum display unit 14 displays the measured spectrum on the display 15. The peak area PA, and the first background area $BA_1$ and the second background area $BA_2$ on both sides of the peak area PA are set by an operator based on the displayed measured spectrum by the detection area setting unit 16, and are stored in the detection area setting unit 16. At this time, the distance between the center of the peak area PA and the center of the first background area $BA_1$ and the distance between the center of the peak area PA and the center of the second background area $BA_2$ are set to be equal to each other.

For the measured spectrum, the peak area PA, and the first background area $BA_1$ and the second background area $BA_2$ which are set by the operator by the detection area setting unit 16 and stored therein are displayed.

Next, the sample S for calculating a coefficient, e.g. the blank sample S which does not contain an element that generates an interfering line, and in which variation in intensity among the peak area PA and the first and the second background areas $BA_1$ and $BA_2$ is small in a background spectrum of fluorescent X-rays to be measured, is measured, whereby the two background correction coefficients k1 and k2 are obtained based on the following equation (5) and equation (6).

$$k1 = 0.5 \times I_B^B / I_{B1}^B \tag{5}$$

$$k2 = 0.5 \times I_B^B / I_{B2}^B \tag{6}$$

The constant 0.5 in equation (5) and equation (6) is based on the distance between the center of the peak area PA and the center of the first background area $BA_1$, and the distance between the center of the peak area PA and the center of the second background area $BA_2$ being equal to each other.

The background correction coefficients k1 and k2 are input in advance in the quantification unit 17, or the background correction coefficients k1 and k2 are automatically calculated in advance by the quantification unit 17, and the analytical sample S is measured, whereby the quantification unit 17 appropriately subtracts a background intensity $I_B = (k1 \times I_{B1} + k2 \times I_{B2})$ in the peak area from the peak intensity $I_P$ based on the following equation (7), calculates a net intensity $I_{net}$ of fluorescent X-rays to be measured, and performs quantitative analysis.

$$I_{net} = I_P - (k1 \times I_{B1} + k2 \times I_{B2}) \tag{7}$$

k1: background correction coefficient for first background area k2: background correction coefficient for second background area When the quantitative analysis is performed based on equation (7), ratios $r_{i1}$ and $r_{i2}$ of intensities of the first and the second background areas $BA_1$ and $BA_2$, respectively, to an intensity of the peak area PA in a background spectrum of fluorescent X-rays to be measured for the blank sample S are previously obtained by a scanning goniometer of a simultaneous multi-elements analysis type X-ray fluorescence spectrometer, and, instead of the background correction coefficients k1 and k2 calculated according to equation (5) and equation (6) described above, background correction coefficients $r_{i1}k1$ and $r_{i2}k2$ obtained by correction through multiplication by the intensity ratios $r_{i1}$ and $r_{i2}$, respectively, may be used. When the background correction coefficients $r_{i1}k1$ and $r_{i2}k2$ obtained by the correction are used, quantitative analysis can be prevented from being influenced by variation of intensities in the peak area PA and the first and the second background areas $BA_1$ and $BA_2$ in the background spectrum of fluorescent X-rays to be measured, for the blank sample S.

In a case where the quantitative analysis is performed, equation (7) described above is used when the number of the detection elements is the same among the peak area PA and the first and the second background areas $BA_1$ and $BA_2$. In a case where the number of the detection elements is different among the peak area PA and the first and the second background areas $BA_1$ and $BA_2$, ratios $r_{n1}$ and $r_{n2}$ of the number of the detection elements in the peak area PA to the numbers of the detection elements in the first and the second background areas $BA_1$ and $BA_2$, respectively, are calculated in advance, and, instead of the background correction coefficients k1 and k2 obtained according to equation (5) and equation (6) described above, background correction coefficients $r_{n1}$k1 and $r_{n2}$k2 which are obtained by correction through multiplication by the ratios $r_{n1}$ and $r_{n2}$ for the respective numbers of the detection elements, are used.

In the X-ray fluorescence analyzing method according to the third embodiment, for the samples S of the analytical kind among which profiles of background of fluorescent X-rays to be measured are different, the peak area PA and the background areas $BA_1$ and $BA_2$ on both sides, respectively, of the peak area PA are set, by the detection area setting unit 16, based on the measured spectrum of the predetermined sample S for setting a detection area such that the distance between the center of the peak area PA and the center of one of the background areas $BA_1$ and $BA_2$ and the distance between the center of the peak area PA and the center of the other of the background areas $BA_1$ and $BA_2$ are equal to each other in the arrangement direction of the detection elements 7, and the two background correction coefficients k1 and k2 are calculated based on the background intensities of the predetermined sample S for calculating a coefficient, to perform the quantitative analysis. Therefore, for samples of an analytical kind among which profiles of background are different, background that is measured so as to indicate an intensity lower than a background intensity which actually occurs, is accurately and quickly corrected with a simple structure, whereby an accurate net intensity can be obtained and high-precision quantitative analysis can be performed.

Next, a wavelength dispersive X-ray fluorescence spectrometer according to a fourth embodiment of the present invention will be described. Difference from the wavelength dispersive X-ray fluorescence spectrometer of the first embodiment will be merely described.

Figure 5:
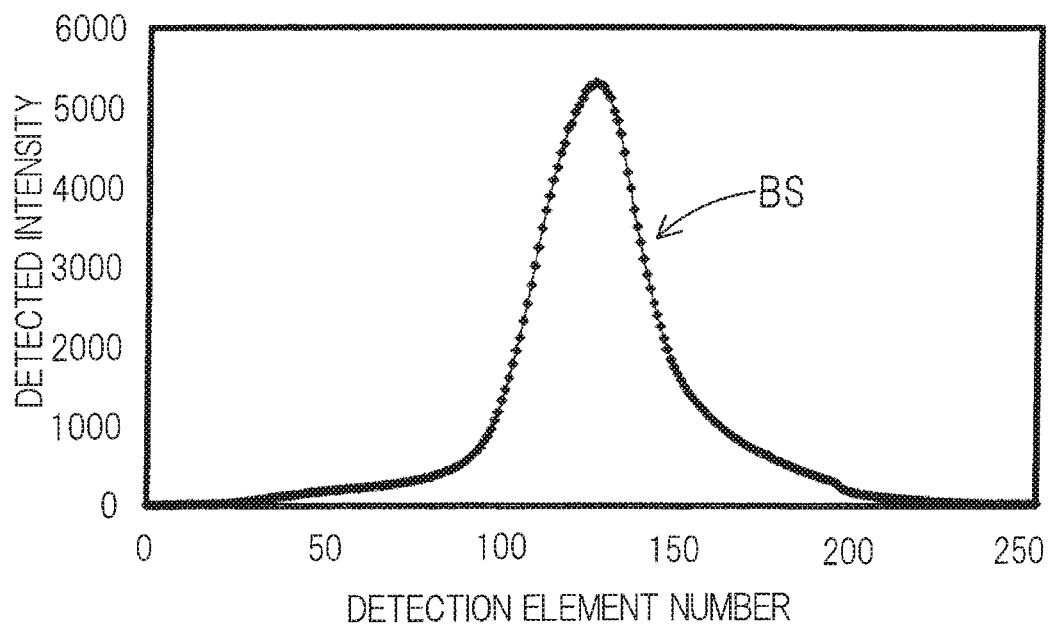
FIG. 5 illustrates a measured spectrum of a blank sample.

In the wavelength dispersive X-ray fluorescence spectrometer according to the fourth embodiment, on the assumption that an intensity of background incident on the detection elements 7 is constant in the arrangement direction of the detection elements 7, the measured spectrum display unit 14 firstly calculates a sensitivity coefficient $\alpha_i$ as a ratio of an incident intensity to a detected intensity for each detection element 7, according to the following equation (8), based on a measured spectrum BS, shown in FIG. 5, for a predetermined blank sample S. In FIG. 5, the abscissa axis represents the detection element numbers, and the same applies also to FIGS. 6 and 7. The predetermined blank sample S is the same as the sample S for setting a detection area and/or the sample S for calculating a coefficient as described in the first and the second embodiments. For example, in a case where Pb-Lβ line is to be measured for a sample that is a rock, the predetermined blank sample S is $SiO_2$ which has a composition similar to a composition of the rock and does not contain Pb that is an element to be measured, and an element that generates an interfering line.

$$\alpha_i = I_P^B / I_i^B \qquad (8)$$

In the measured spectrum BS of the blank sample S, the detected intensity $I_P^B$ by the detection element 7 at a peak position is assumed as an incident intensity with respect to the detected intensity $I_i^B$ by the i-th detection element 7.

Figure 6:
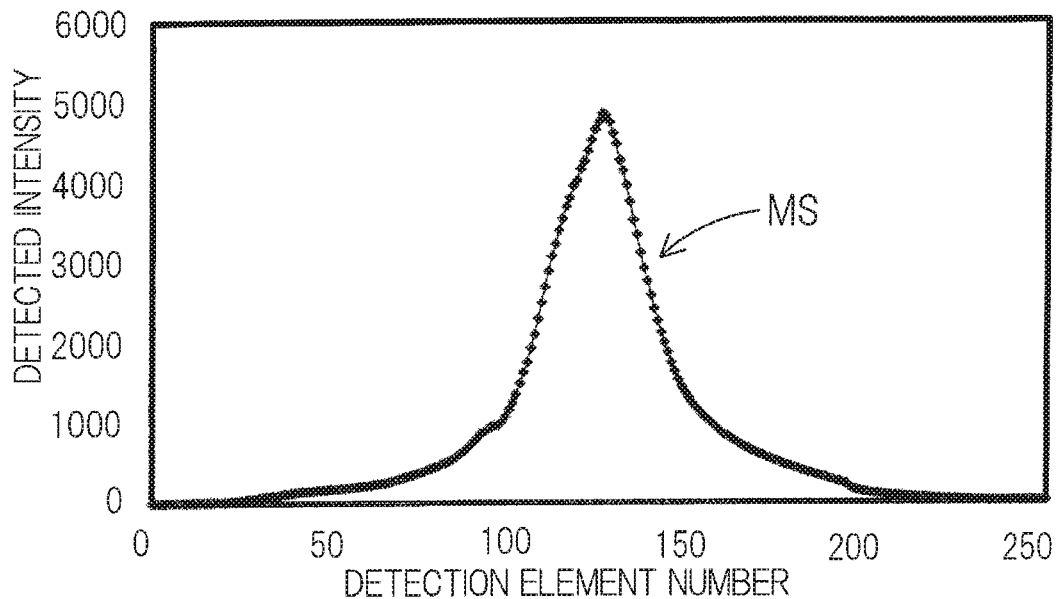
FIG. 6 illustrates a measured spectrum of an analytical rock sample.
Figure 7:
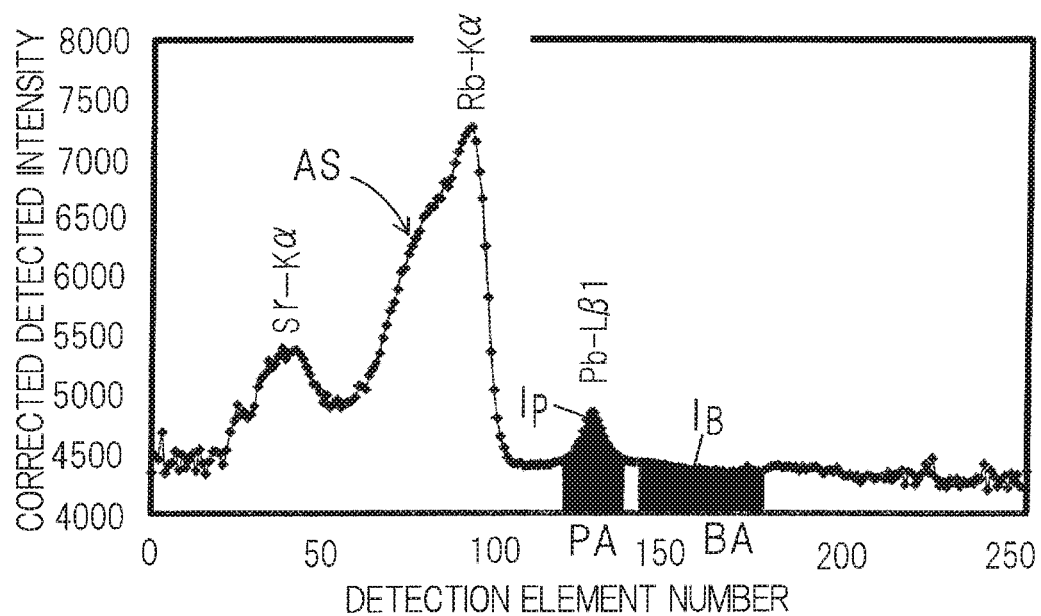
FIG. 7 illustrates a peak area and a background area of a corrected spectrum of an analytical rock sample.

When the predetermined sample S for setting a detection area, e.g., an analytical rock sample S is measured, the measured spectrum display unit 14 displays, on the display 15, a relationship between the detection element number and a corrected detected intensity $I_i^C$ obtained by multiplying the detected intensity $I_i$ by the detection element 7, by the sensitivity coefficient $\alpha_i$, according to equation (9) described below, as a corrected spectrum AS shown in FIG. 7, instead of or in addition to the measured spectrum MS which is similar to the measured spectrum MS shown in FIG. 4 and which represents a relationship between the detection element number (position in the arrangement direction of the detection elements 7) and the detected intensity by the detection element 7, which are shown in FIG. 6.

$$I_i^C = \alpha_i I_i \qquad (9)$$

In FIG. 7, the kinds of lines at the respective peaks are identified and displayed according to conventional art. However, in the present invention, those identification and display are not necessarily performed. In a case where both the corrected spectrum AS in FIG. 7 and the measured spectrum MS in FIG. 6 are displayed on the display 15, both spectra are displayed on one screen so as to overlay each other, or are displayed separately in one screen, or are displayed on two screens which can be switched. Thus, in a case where not only the corrected spectrum AS in FIG. 7 but also the measured spectrum MS in FIG. 6 is displayed, a detection element which is distant from the peak position in the abscissa axis direction and which has a low sensitivity as a spectroscopic system is easily set so as to be excluded from the background area BA, with reference to the measured spectrum MS in FIG. 6 in order to enhance an accuracy for the background intensity $I_B$.

In the wavelength dispersive X-ray fluorescence spectrometer according to the fourth embodiment, the background correction coefficient k which is previously calculated outside the spectrometer is not input in the quantification unit 17, and, in a case where, after an operator has set the peak area PA and the background area BA, the quantification unit 17 calculates a net intensity $I_{net}$ of fluorescent X-rays to be measured based on equation (1) and equation (2) described above, and performs the quantitative analysis, the background correction coefficient k is automatically calculated according to equation (3) described above based on the measured spectrum $BS_c$ of the blank sample S, shown in FIG. 5. However, in the example shown in FIG. 7, since the second background area $BA_2$ is not set, $I_{B2}^B = 0$ is used.

In the wavelength dispersive X-ray fluorescence spectrometer according to the fourth embodiment, instead of or in addition to the measured spectrum MS, the corrected spectrum AS described above is displayed on the display 15, whereby background can be more accurately corrected, a net intensity can be more accurately obtained, and higher-precision quantitative analysis can be performed.

Next, an X-ray fluorescence analyzing method, according to a fifth embodiment of the present invention, for performing quantitative analysis using the wavelength dispersive X-ray fluorescence spectrometer according to the fourth embodiment will be described. In the X-ray fluorescence analyzing method, for samples S of an analytical kind having similar profiles of background of fluorescent X-rays to be measured, in corrected spectra displayed by the measured spectrum display unit 14, the peak area PA and the background area BA are set, by the detection area setting unit 16, based on the corrected spectrum of a predetermined sample S for setting a detection area, and a single background correction coefficient k is calculated based on a background intensity of a predetermined sample S for calculating a coefficient, to perform quantitative analysis.

The samples S of the analytical kind having similar profiles of background of fluorescent X-rays to be measured represent samples S, of an analytical kind, in which profiles of background in the adjacent area of peak are similar to each other even when the sample S is changed among them. This case corresponds to a case where fluorescent X-rays of a heavy element are to be measured for an oxide sample, for example, a case where Pb-Lβ line is to be measured for a sample that is a rock.

In the X-ray fluorescence analyzing method according to the fifth embodiment, the wavelength dispersive X-ray fluorescence spectrometer according to the fourth embodiment is used. Firstly, as described above, the predetermined blank sample S is measured, and the measured spectrum display unit 14 calculates the sensitivity coefficient $\alpha_i$.

The predetermined sample S for setting a detection area, for example, one of analytical rock samples S is measured, and the measured spectrum display unit 14 displays, on the display 15, the corrected spectrum AS shown in FIG. 7 instead of or in addition to the measured spectrum MS shown in FIG. 6. As in the operation for the wavelength dispersive X-ray fluorescence spectrometer according to the first embodiment, the peak area PA and the background area BA as shown in FIG. 7 are set by and stored in the detection area setting unit 16, based on the displayed corrected spectrum AS. In a case where not only the corrected spectrum AS shown in FIG. 7 but also the measured spectrum MS shown in FIG. 6 is displayed, a detection element which is distant from the peak position in the abscissa axis direction and which has a low sensitivity as a spectroscopic system is easily set so as to be excluded from the background area BA as described above.

After the peak area PA and the background area BA are set, the background correction coefficient k is automatically calculated by the quantification unit 17 according to equation (3) described above (however, $I_{B2}{}^B=0$), based on the measured spectrum BS, of the blank sample S, shown in FIG. 5. For the measured analytical sample S, the quantification unit 17 calculates a net intensity $I_{net}$ of fluorescent X-rays to be measured according to equation (1) and equation (2) described above (however, $I_{B2}=0$ in equation (2)), and performs quantitative analysis.

In the X-ray fluorescence analyzing method according to the fifth embodiment, the wavelength dispersive X-ray fluorescence spectrometer according to the fourth embodiment is used to perform quantitative analysis. Therefore, for the samples of the analytical kind having the similar profiles of background, background can be more accurately corrected, the net intensity can be more accurately obtained, and higher-precision quantitative analysis can be performed.

Next, an X-ray fluorescence analyzing method, according to a sixth embodiment of the present invention, for performing quantitative analysis using the wavelength dispersive X-ray fluorescence spectrometer according to the fourth embodiment will be described. In the X-ray fluorescence analyzing method, for samples S of an analytical kind among which profiles of background of fluorescent X-rays to be measured, in corrected spectra displayed by the measured spectrum display unit 14, are different according to, for example, whether or not influence of a skirt of a large interfering peak occurs, the peak area PA and the background areas $BA_1$ and $BA_2$ on both sides, respectively, of the peak area PA are set, by the detection area setting unit 16, based on a corrected spectrum of a predetermined sample S for setting a detection area, such that a distance between a center of the peak area PA and a center of one of the background areas $BA_1$ and $BA_2$ is equal to a distance between the center of the peak area PA and a center of the other of the background areas $BA_1$ and $BA_2$ in the arrangement direction of the detection elements 7, and two background correction coefficients k1 and k2 are calculated based on background intensities of a predetermined sample S for calculating a coefficient. It is assumed that, in the peak area of fluorescent X-rays to be measured, and the background areas on both sides thereof, the profile of background intensity which actually occurs is on a straight line.

The samples S of the analytical kind among which profiles of background of fluorescent X-rays to be measured are different represent samples S, of an analytical kind, which include at least one sample S, of an analytical kind, which has a different profile of background in the adjacent area of peak. The samples S are, for example, samples S of an analytical kind including a sample S that generates an interfering line, near the peak area PA.

In the X-ray fluorescence analyzing method according to the sixth embodiment, the wavelength dispersive X-ray fluorescence spectrometer according to the fourth embodiment is used. Firstly, as described above, the predetermined blank sample S is measured and the measured spectrum display unit 14 calculates the sensitivity coefficient $\alpha_i$.

The predetermined sample S for setting a detection area, for example, a sample S that generates an interfering line, near the peak area PA, is measured, and the measured spectrum display unit 14 displays the corrected spectrum on the display 15, instead of or in addition to the measured spectrum. The peak area PA, and the first background area $BA_1$ and the second background area $BA_2$ on both sides of the peak area PA are set, by the detection area setting unit 16, based on the displayed corrected spectrum, and are stored in the detection area setting unit 16. At this time, the distance between the center of the peak area PA and the center of the first background area $BA_1$ and the distance between the center of the peak area PA and the center of the second background area $BA_2$ are set to be equal to each other. In a case where not only the corrected spectrum but also the measured spectrum is displayed, a detection element which is distant from the peak position in the abscissa axis direction and which has a low sensitivity as a spectroscopic system is easily set so as to be excluded from the background areas $BA_1$ and $BA_2$, as described above.

The peak area PA, the first background area $BA_1$, and the second background area $BA_2$ which are set by an operator by the detection area setting unit 16 and stored therein are displayed in the corrected spectrum.

After the peak area PA and the background area BA have been set, the two background correction coefficients k1 and k2 are automatically calculated according to equation (5) and equation (6) described above, based on the measured spectrum of the blank sample S by the quantification unit 17. When the analytical sample S is measured, the quantification unit 17 calculates the net intensity $I_{net}$ of the fluorescent X-rays to be measured according to equation (7) described above, and performs quantitative analysis.

In the X-ray fluorescence analyzing method according to the sixth embodiment, the quantitative analysis is performed by using the wavelength dispersive X-ray fluorescence spectrometer according to the fourth embodiment. Therefore, for the samples of the analytical kind having the different profiles of background, background can be more accurately corrected, the net intensity can be more accurately obtained, and higher-precision quantitative analysis can be performed.

Figure 8:
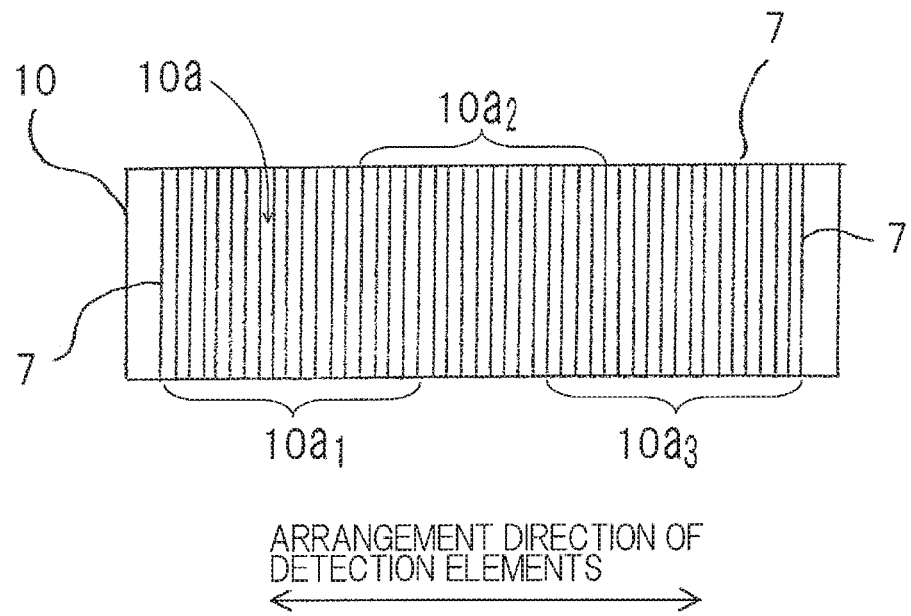
FIG. 8 illustrates a receiving surface of a position sensitive detector.
Figure 9:
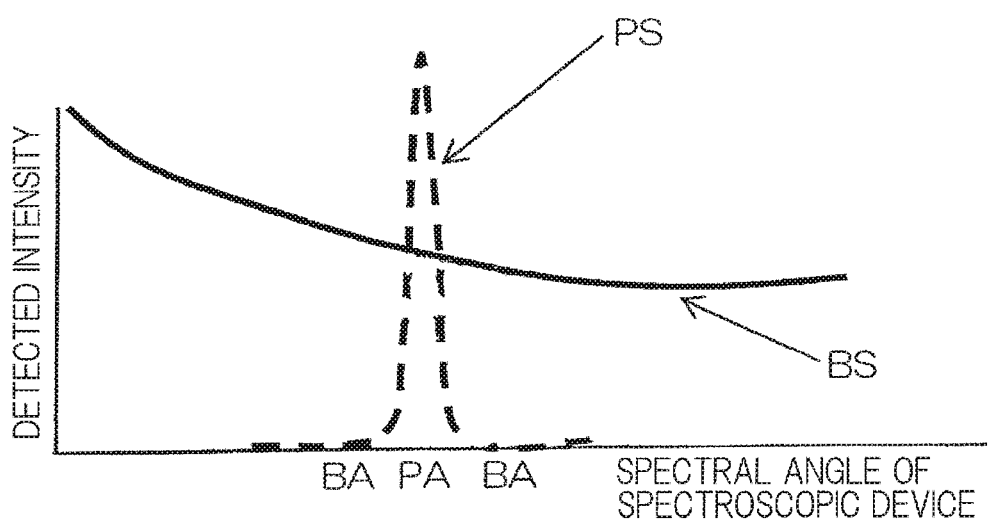
FIG. 9 schematically illustrates a spectrum of fluorescent X-rays and a background spectrum.

In the wavelength dispersive X-ray fluorescence spectrometer according to the first embodiment and the fourth embodiment, as shown in FIG. 8, it is preferable that a plurality of, for example, three receiving areas $10a_1$, $10a_2$, $10a_3$ which are aligned in the arrangement direction of the detection elements 7 are set in a receiving surface $10a$ of the position sensitive detector 10, and the position sensitive detector 10 is moved in the arrangement direction of the detection elements 7, whereby the receiving area to be used for a spectral angle range to be measured is changed. The detection elements 7 each have a life span for counting. In a case where the detection elements 7 are continuously used after the life span is exhausted, performance such as energy resolution is degraded and the detection elements 7 do not accurately function. However, in this advantageous configuration, in the focusing optical system, a state where the entirety of the position sensitive detector 10 cannot be used due to deterioration in performance of a certain detection element 7 is avoided. Therefore, while the performance of the position sensitive detector 10, which is expensive, is maintained, the position sensitive detector 10 can be used for a long time period.

In this advantageous configuration, each receiving area has the length, that is, the number of the detection elements, which can meet the spectral angle range to be measured, in the arrangement direction of the detection elements 7. However, both end portions of each receiving area in the arrangement direction of the detection elements 7, are distant from the peak position, and, at the positions of the end portions, sensitivity is low as a spectroscopic system, and the intensity of the secondary X-rays 41 incident on the detection element 7 at that positions is very low as can be understood from, for example, the measured spectrum MS in FIG. 6. Therefore, the end portions of the plurality of receiving areas $10a_1$, $10a_2$, $10a_3$ overlap each other in the arrangement direction of the detection elements 7, as illustrated in FIG. 8, whereby the position sensitive detector 10 can be more efficiently used for an elongated time period.

The receiving area to be used is changed, for example, when the average cumulative count per one detection element has reached a predetermined cumulative count value, when the maximal value of the cumulative count of each detection element has reached a predetermined cumulative count value, or when the minimal value of an energy resolution of each detection element has reached a predetermined value. The background correction coefficient is updated at this time.

As described above, in the present invention, while a spectrum is being observed, the peak area and the background area can be appropriately set. Therefore, high-precision quantitative analysis can be simply performed quickly.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . primary X-rays
2 . . . X-ray source
4 . . . secondary X-rays
5 . . . divergence slit
6 . . . spectroscopic device
7 . . . detection element
10 . . . position sensitive detector (one-dimensional detector)
  $10a$ . . . receiving surface
  $10a_1$, $10a_2$, $10a_3$ . . . receiving area
14 . . . measured spectrum display unit
15 . . . display
16 . . . detection area setting unit
17 . . . quantification unit
41 . . . secondary X-rays at different spectral angles
42 . . . focused secondary X-rays
AS . . . corrected spectrum
$BA_1$, $BA_2$ . . . background area
BS, MS, PS . . . measured spectrum
PA . . . peak area
S . . . sample, sample for setting detection area, sample for calculation coefficient, blank sample

What is claimed is:

1. A wavelength dispersive X-ray fluorescence spectrometer of a focusing optical system, the wavelength dispersive X-ray fluorescence spectrometer comprising:
an X-ray source configured to irradiate a sample with primary X-rays;
a divergence slit configured to allow secondary X-rays generated from the sample to pass therethrough;
a spectroscopic device configured to monochromate and focus the secondary X-rays that have passed through the divergence slit; and
a position sensitive detector configured to have a plurality of detection elements that are disposed in a spectral angle direction of the spectroscopic device, so as to detect intensities of the secondary X-rays at different spectral angles in focused secondary X-rays obtained by the secondary X-rays being focused by the spectroscopic device, by using the detection elements corresponding to the secondary X-rays at different spectral angles,
the divergence slit, the spectroscopic device, and the position sensitive detector being fixed thereto, the wavelength dispersive X-ray fluorescence spectrometer comprising:
a measured spectrum display unit configured to display a relationship between a position, in an arrangement direction, of each detection element, and a detected intensity by the detection element, as a measured spectrum, on a display;
a detection area setting unit configured to allow an operator to set a peak area that is an area of the detection elements corresponding to fluorescent X-rays to be measured, and a background area that is an area of the detection elements corresponding to background of the fluorescent X-rays to be measured, in the arrangement direction of the detection elements; and
a quantification unit configured to calculate, as a net intensity, an intensity of the fluorescent X-rays to be measured, based on a peak intensity obtained by integrating detected intensities by the detection elements in the peak area, a background intensity obtained by integrating detected intensities by the detection elements in the background area, and a background correction coefficient which is previously calculated, and to perform quantitative analysis.

2. An X-ray fluorescence analyzing method for performing quantitative analysis using the wavelength dispersive X-ray fluorescence spectrometer as claimed in claim 1, wherein for samples of an analytical kind having similar profiles of background of fluorescent X-rays to be measured, in measured spectra displayed by the measured spectrum display unit, the peak area and the background area are set, by the detection area setting unit, based on a measured spectrum of a predetermined sample for setting a detection area, and a single background correction coefficient is calculated based on a background intensity of a predetermined sample for calculating a coefficient.

3. An X-ray fluorescence analyzing method for performing quantitative analysis using the wavelength dispersive X-ray fluorescence spectrometer as claimed in claim 1, wherein for samples of an analytical kind having different profiles of background of fluorescent X-rays to be measured, in measured spectra displayed by the measured spectrum display unit, the peak area and the background areas on both sides, respectively, of the peak area are set, by the detection area setting unit, based on a measured spectrum of a predetermined sample for setting a detection area such that a distance between a center of the peak area and a center of one of the background areas and a distance between the center of the peak area and a center of the other of the background areas are equal to each other in the arrangement direction of the detection elements, and two background correction coefficients are calculated based on background intensities of a predetermined sample for calculating a coefficient.

4. The wavelength dispersive X-ray fluorescence spectrometer as claimed in claim 1, wherein the measured spectrum display unit calculates a sensitivity coefficient as a ratio of an incident intensity to a detected intensity for each detection element, based on a measured spectrum of a predetermined blank sample, on the assumption that an intensity of background incident on the detection elements is constant in the arrangement direction of the detection elements, and displays a relationship between a position in the arrangement direction of the detection elements and a corrected detected intensity obtained by multiplying a detected intensity by the detection element, by the sensitivity coefficient, as a corrected spectrum, on the display, instead of or in addition to the measured spectrum being displayed.

5. An X-ray fluorescence analyzing method for performing quantitative analysis using the wavelength dispersive X-ray fluorescence spectrometer as claimed in claim 4, wherein for samples of an analytical kind having similar profiles of background of fluorescent X-rays to be measured, in corrected spectra displayed by the measured spectrum display unit, the peak area and the background area are set, by the detection area setting unit, based on a corrected spectrum of a predetermined sample for setting a detection area, and a single background correction coefficient is calculated based on a background intensity of a predetermined sample for calculating a coefficient.

6. An X-ray fluorescence analyzing method for performing quantitative analysis using the wavelength dispersive X-ray fluorescence spectrometer as claimed in claim 4, wherein for samples of an analytical kind having different profiles of background of fluorescent X-rays to be measured, in corrected spectra displayed by the measured spectrum display unit, the peak area and the background areas on both sides, respectively, of the peak area are set, by the detection area setting unit, based on a corrected spectrum of a predetermined sample for setting a detection area such that a distance between a center of the peak area and a center of one of the background areas and a distance between the center of the peak area and a center of the other of the background areas are equal to each other in the arrangement direction of the detection elements, and two background correction coefficients are calculated based on background intensities of a predetermined sample for calculating a coefficient.

7. The wavelength dispersive X-ray fluorescence spectrometer as claimed in claim 1, wherein a plurality of receiving areas which are aligned in the arrangement direction of the detection elements are set in a receiving surface of the position sensitive detector, and the receiving area to be used is changed so as to correspond to a spectral angle range to be measured, by the position sensitive detector being moved in the arrangement direction of the detection elements.

* * * * *